Dec. 24, 1968　　　　　F. PRADENAS　　　　　3,418,448
ELECTRICALLY HEATABLE PANELS
Original Filed March 20, 1963　　　　　　　　　4 Sheets-Sheet 1

INVENTOR.
FERNANDO PRADENAS
BY George B. White
ATTORNEY

Dec. 24, 1968      F. PRADENAS      3,418,448

ELECTRICALLY HEATABLE PANELS

Original Filed March 20, 1963      4 Sheets-Sheet 2

INVENTOR.
FERNANDO PRADENAS
BY George B. White
ATTORNEY

Dec. 24, 1968  F. PRADENAS  3,418,448
ELECTRICALLY HEATABLE PANELS
Original Filed March 20, 1963  4 Sheets-Sheet 3
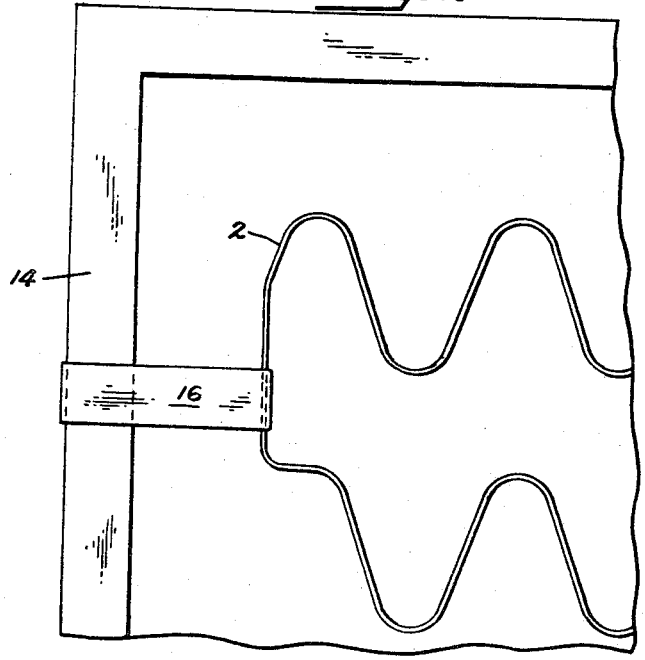
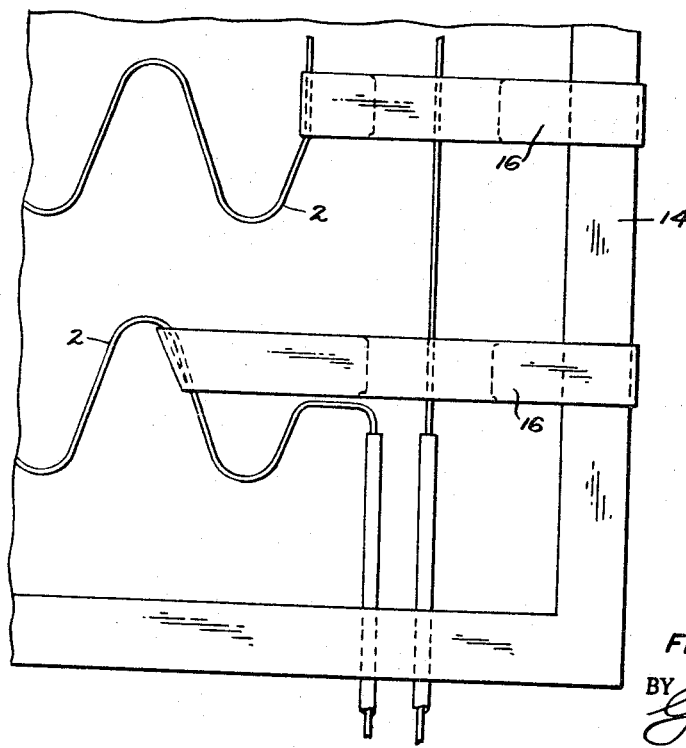
INVENTOR.
FERNANDO PRADENAS
BY George B. White
ATTORNEY Dec. 24, 1968   F. PRADENAS   3,418,448
ELECTRICALLY HEATABLE PANELS
Original Filed March 20, 1963   4 Sheets-Sheet 4
*Fig. 7.*
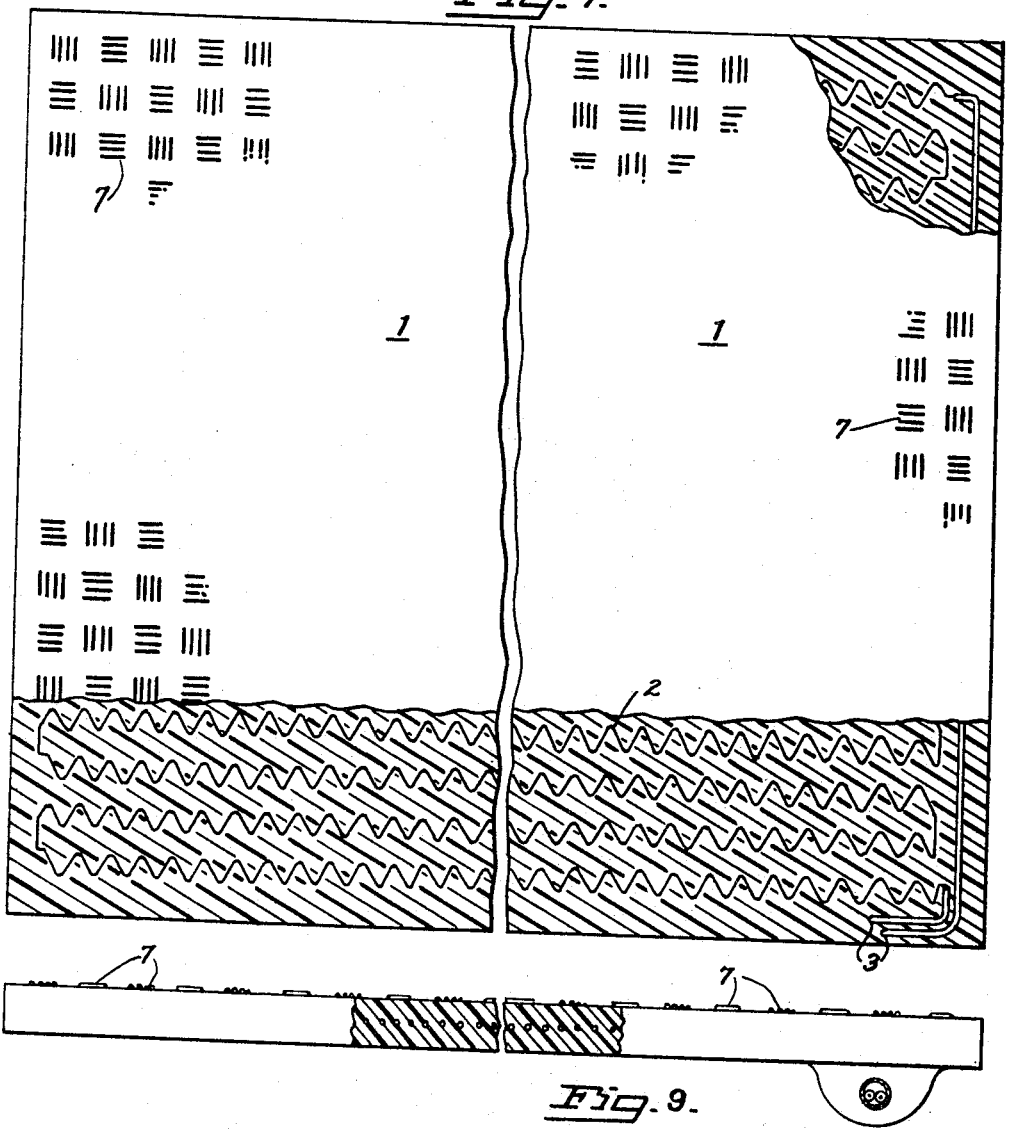
*Fig. 9.*
*Fig. 8.*
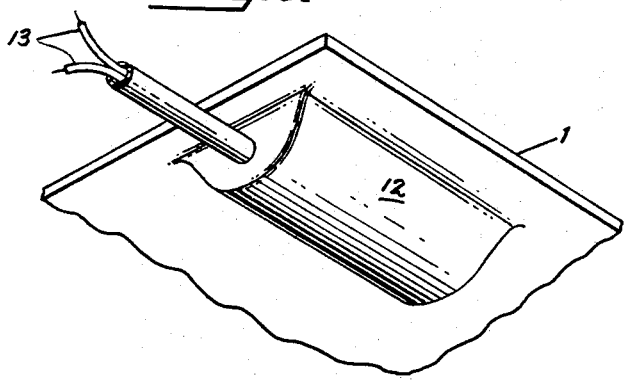
INVENTOR.
FERNANDO PRADENAS
BY
George B. White
ATTORNEY United States Patent Office 3,418,448
Patented Dec. 24, 1968

3,418,448
ELECTRICALLY HEATABLE PANELS
Fernando Pradenas, San Anselmo, Calif., assignor to H. Koch & Sons, Corte Madera, Calif., a corporation of California
Original application Mar 20, 1963, Ser. No. 266,570. Divided and this application Jan. 5, 1967, Ser. No. 607,566
6 Claims. (Cl. 219—213)

ABSTRACT OF THE DISCLOSURE

A heating panel made of layers of fiberglass into which is embedded a sinusoidal shaped heating wire, integrated together by polyester resin in a mold, the ends of the wire projecting from an end of the panel, one face of said panel having an integral wearing surface formed out of polyester gel coat of special formulation containing a hardening agent such as calcium carbonate filler for wear and strength and weathering and shaped to form non-skid projections on the wearing surface.

Cross reference

This is a divisional application of co-pending application of Fernando Pradenas, Ser. No. 266,570, filed Mar. 20, 1963 for Electrically Heated Panels and Method of Making the Same.

Brief summary of the invention.

Other features of the invention specifically are a heating element embedded in layers of fiberglass with suitable resin, one face of the panel having a layer of special plastic of high wear resistance and weather resistance, all being integrated together into a unitary panel; the heating element or conductor being a suitably strong resistance wire of sinusoidal shape bent upon itself back and forth the full length and width of the panel so as to form a strong continuous heating element and enable it to contract and expand with the fiberglass reinforced resin in the event that the panel is bent, although the panel has substantial tensile and flexural strength by reason of the layers of fiberglass in the resin which combination completely fills the mold of an outline and thickness of the intended panel.

Description of the views of the drawings

FIG. 5 is a fragmental view of the mounting of the heating wire on the temporary frame.

FIG. 6 is a fragmental view of the mounting of the heating wire near its terminal wires on the temporary frame.

FIG. 7 is a fragmental partly sectional top view of a panel.

FIG. 8 is a fragmental perspective view of a corner of the bottom face of the panel showing the covered joint for the outlet wires.

FIG. 9 is a fragmental partly cross-sectional view of the finished panel.

Detailed description

Figure 1:
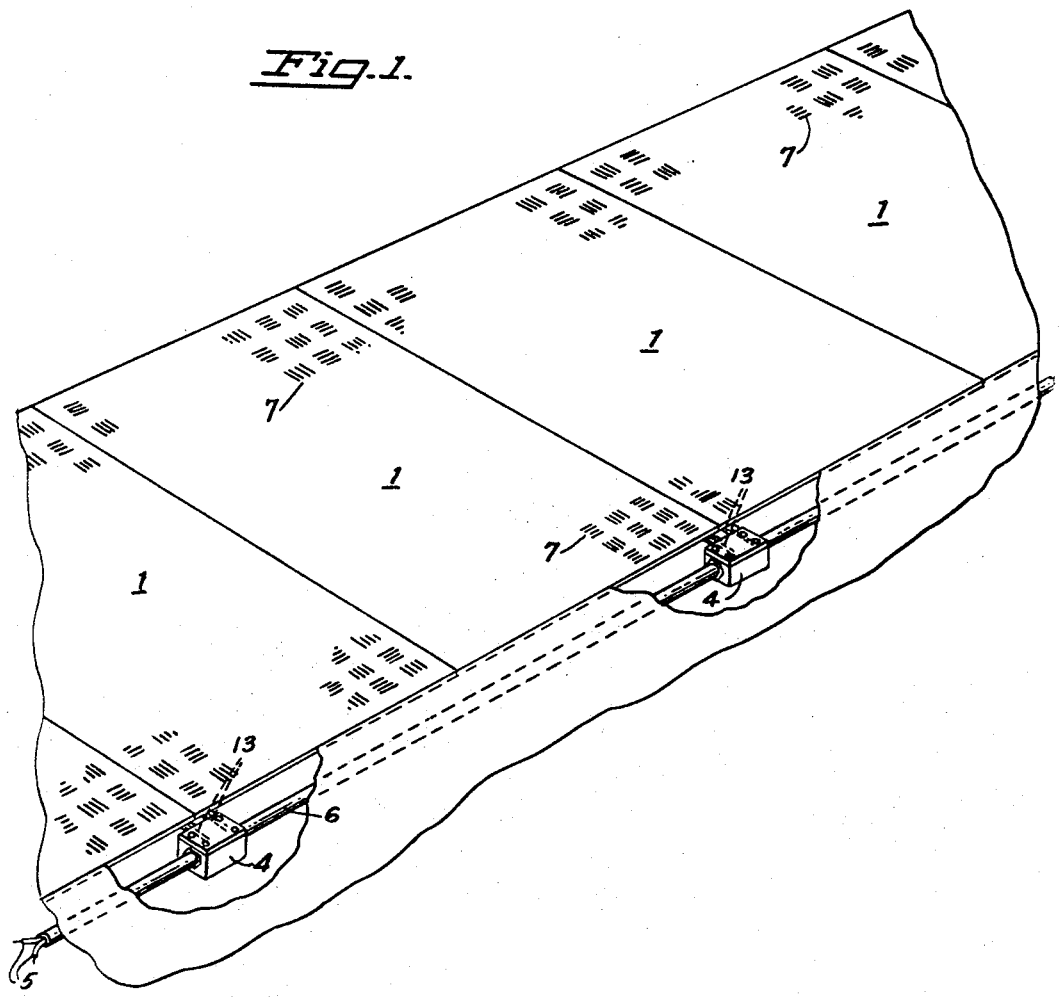
FIG. 1 is a perspective view of a driveway or walk constructed out of heated panels in accordance with my invention.

The heatable panel of this invention can be molded in various shapes and thicknesses suitable for various uses. In the present illustration the panel 1 is made comparatively thin and it is made of fiberglass reinforced plastic with a heating wire 2 embedded and integrated in the fiberglass reinforced plastic laminates. Terminals 3 extending from one end of each panel as shown in FIG. 1 are connected in suitable junction boxes 4 to electric wires 5 in a conduit 6 along the side of the walk or surface covered by the series of panels 1.

In FIG. 1 the panels are arranged for use as a cover for a driveway. These panels therefore are provided with suitable wearing projections 7 and a toughened wearing surface as hereinafter described.

The heating wires 2 are formed to produce uniform heat throughout each panel. Therefore, such cover would be eminently adapted to keep walks and driveways clear of snow or ice, or generally to warm the surrounding air.

Figure 2:
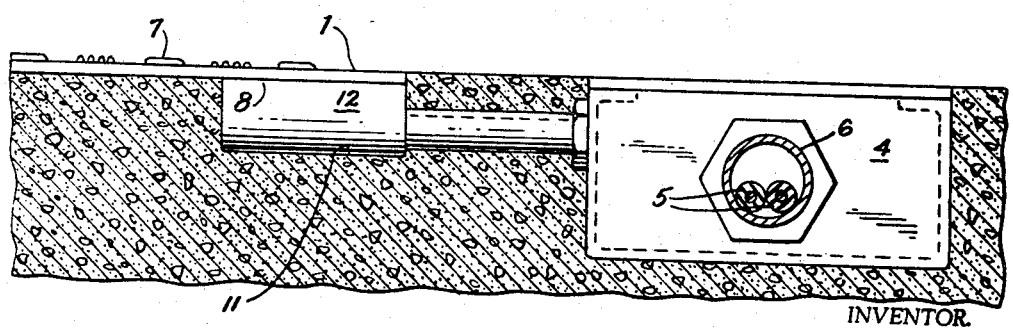
FIG. 2 is a fragmental sectional view of the driveway at one of the joint boxes.

As shown in FIG. 2, the panels are secured by a suitable plastic adhesive layer 8 on the top of the usual surface of the concrete walk or driveway. A suitable cavity 11 is formed in the driveway to accommodate a junction 12 at a corner of the panel 1 to accommodate the panel leads 13 from the heating element 2 to the junction box 4.

Each panel 1 is made out of several laminates of the fiberglass layers between which is sandwiched the heating element 2, which layers are suitably saturated with resin to form in the present illustration a pressure laminated glass fiber base polyester thermosetting resin.

In the method of making such a panel the conductor is first formed out of Nichrome wire of comparatively high strength and in such a shape as to be best for uniform heating and high mechanical strength. The size and length of the wire are predetermined to suit the amount of heat needed to be supplied by the panel in a given application. For instance in a driveway for snow melting the total resistance of the heating element is lower than for indoor heating. The wire is first formed into the sinusoidal shape so as to have a continuous "tape" in the aforesaid wave shape. This continuous wave shape wire is then cut to the required length and is strung back and forth, namely the wire is turned upon itself repeatedly into parallel branches substantially of the length of the panel area, so that when the entire length of the wire is strung back and forth it will also cover the entire width of the panel area.

Figure 4:
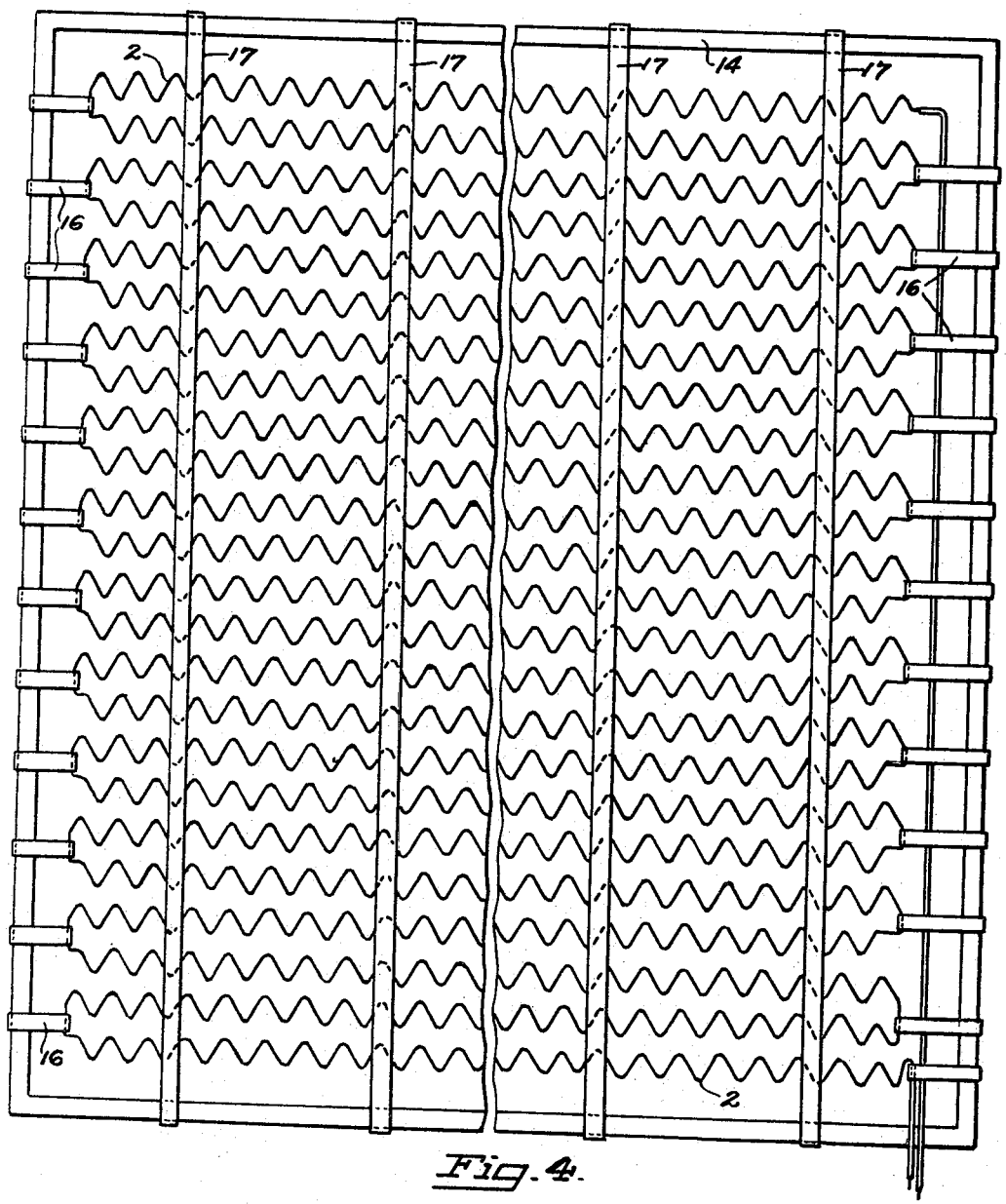
FIG. 4 is a fragmental plan view of the forming and mounting of the heating wire of my heatable panel.
Figure 3:
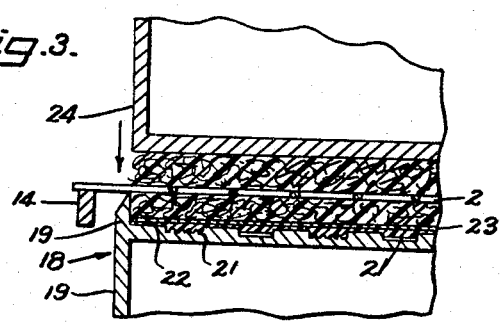
FIG. 3 is a fragmental sectional view of the layers of the panel in the mold.

The wire so formed is held in a metal frame as shown in FIGS. 4, 5 and 6 by suitable polyester tapes 16. Such polyester tape is placed around the metal frame 14 at each turn of the wire as shown in FIG. 5 and then it is placed around the wire and heat sealed as it is turned upon itself so as to hold the strung wire in place in the metal frame 14. Similarly long strips 17 of such polyester tape are sealed to the metal frame 14 transversely in spaced relation as shown in FIG. 4 and also doubled and sealed over the branches of the wire 2 to further assist in holding the strung wire in the metal frame.

In the illustrative embodiment herein there is provided a mold 18 which has sides 19 corresponding to the thickness of the finished laminate panel 1. When projections 7 are needed for the wearing surface then the bottom of the mold is provided with suitable mold cavities 21 to form the abrasive non-skid projections on the wearing surface.

A suitable polyester gel coat 22 is provided to fill the mold cavities 21. This polyester gel coat is of a special formulation for wear and strength and weathering, such as for instance a calcium carbonate filler or other hardening agent introduced in the resin. Then a second polyester gel coat 23 is applied by spraying it to completely cover the whole surface of the mold with weather resistant surface of comparative thinness.

Then a layer of fiberglass is laid onto the mold 18. At present two to four plies glass mat of suitable weight is used. Then the heating wire 2 in the metal frame 14 is placed over the mold. The area defined by the inside perimeter of the metal frame 14 is such that the metal frame 14 fits over the outside of the mold flanges 19, thus holding the strung wire 2 within the area defined between flanges 19 of the mold.

Then at least another layer of fiberglass is placed upon the conductor wire 2. Then suitable polyester resin is poured into the mold and over the fiberglass layers. Then the top mold plate 24 is lowered in the usual manner by hydraulic pressure or the like so as to compress the laminates in the mold 18.

The mold parts 18 and 24 are kept at a constant temperature in any suitable manner, for instance by hot oil passing through cavities in the respective molds to keep them, in the present instance, at about 220° F. temperature. As the mold plate 24 is lowered it coacts with the edges of the flanges 19 to cut the tapes 16 and 17 respectively. After ten minutes the laminates, as well as the tapes 16 and 17 are cured into an integral unit into a panel in the shape of the mold with the heating wire integrated therein. The terminals 3 of said wire project through one corner of the panel.

The final laminate so cured is lifted out of the press and the leads 13 are connected to the wire ends 3. These terminals 3 are connected to their leads 13 in an integral junction such as the epoxy potted junction 12 shown in FIG. 8.

As shown in FIG. 1, when more than one panel is used right and left arrangements for the leads 13 may be used on the panels so that one junction box 4 can feed two panels. Other types of junctions could be utilized to connect the electric wires of the respective panels to sources of electricity either directly or in series or in parallel with other panels.

The fiberglass layers integrated around the heating element function to protect the elements against mechanical breakage or electrical short circuits. The fiberglass layers are also non-conductors of electricity and insulate the heating element from the outside to positively prevent electric shocks to persons in contact with the panels. The panel is also fire-resistant and self-extinguishing because of the addition to the resin of suitable quantity of chlorowax and antimony trioxide. The resin used is also of high temperature distortion resin with distortion point of over 300° F.

While I have shown and described some illustrative embodiments of my invention, it is understood that the invention is not to be limited to the details shown and is capable of modification and variation within the spirit of the invention and within the scope of the appended claims.

What is claimed is:
1. A heating panel comprising
   (a) layers of electric insulating glass fiber,
   (b) an electric conductor element formed in substantially sinusoidal configuration and bent to spread over the entire area of the panel sandwiched between said layers of glass fiber,
   (c) a wearing surface formed by a layer of resin gel containing a hardening agent and being wear and weather resistant,
   (d) said layers of fiberglass and conductor and resin gel wearing surface being integrated by a resin into an integral panel of predetermined configuration.
2. The invention defined in claim 1 wherein said resin is a thermosetting resin.
3. The invention defined in claim 1, said resin being a polyester thermosetting resin, and said wearing surface being a thermosetting polyester gel coat containing a hardening agent as a filler.
4. The invention defined in claim 1, and
   (e) anti-skid projections on said wearing surface.
5. The invention defined in claim 1,
   (e) the ends of said conductor projecting from said panel,
   (f) and means to connect said ends to an electrical wiring system.
6. The invention defined in claim 5,
   (g) an electrical conduit,
   (h) and additional panels laid side by side with said panel to cover a given surface along said electric conduit, the said connecting means being connected to said conduit.

References Cited
UNITED STATES PATENTS

| | | | |
|---|---|---|---|
| 2,522,841 | 9/1950 | Ross | 219—345 |
| 2,844,696 | 7/1958 | Custer | 219—345 |
| 2,912,555 | 11/1959 | Jamison | 219—213 X |
| 3,031,739 | 5/1962 | Boggs | 219—345 X |
| 3,069,522 | 12/1962 | Jamison | 219—213 X |

RICHARD M. WOOD, *Primary Examiner.*

C. L. ALBRITTON, *Assistant Examiner.*

U.S. Cl. X.R.

219—345, 544